Figure 7:
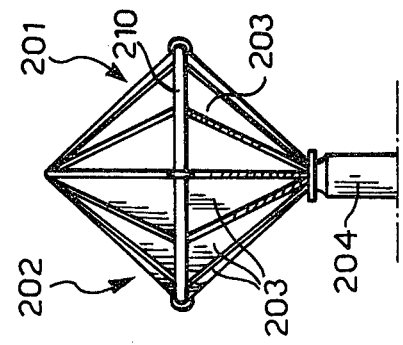

United States Patent [19]

Bona

[11] 4,438,862
[45] Mar. 27, 1984

[54] DEVICE FOR PREVENTING THE UNAUTHORIZED REMOVAL OF FUEL FROM THE TANK OF A MOTOR VEHICLE

[75] Inventor: Eligio Bona, Turin, Italy
[73] Assignee: Fiat Auto S.p.A., Turin, Italy
[21] Appl. No.: 311,804
[22] Filed: Oct. 15, 1981

[30] Foreign Application Priority Data

Oct. 20, 1980 [IT] Italy ............................. 68604 A/80
May 15, 1981 [IT] Italy ............................. 67652 A/81

[51] Int. Cl.³ .................................................. B65B 3/06
[52] U.S. Cl. .................................. 220/86 AT; 220/86 R
[58] Field of Search ............... 220/86 AT, 86 R, 373, 220/86 NR, 90.2, 90.4; 215/17, 24; 4/292; 210/448, 449, 435; 138/44, 45, 39; 366/336, 340; 15/104.05, 104.09

[56] References Cited

U.S. PATENT DOCUMENTS

| | | | |
|---|---|---|---|
| 1,512,065 | 10/1924 | Taylor | 220/86 R |
| 1,766,916 | 6/1930 | MacLiver | 220/86 AT |
| 1,931,342 | 10/1933 | Broderick | 220/86 AT |
| 2,005,359 | 6/1935 | Bagnoli et al. | 15/104.09 |
| 2,354,245 | 7/1944 | Corbosiero | 15/104.09 X |
| 2,371,241 | 3/1945 | Jaffa | 220/86 AT |
| 2,372,545 | 3/1945 | Breedlove | 220/86 AT |
| 2,521,076 | 9/1950 | McDuffie | 15/104.09 X |
| 2,539,354 | 1/1951 | Minyard | 15/104.09 X |
| 2,559,994 | 7/1951 | Paludan | 15/104.09 X |
| 2,744,631 | 5/1956 | Toombs | 220/90.4 |
| 2,975,925 | 3/1961 | Chambers | 220/90.2 |
| 3,016,075 | 1/1962 | Mantelet | 15/104.09 X |
| 3,144,240 | 8/1964 | Connell | 15/104.05 X |
| 3,161,360 | 12/1964 | Levine | 4/292 |
| 3,264,173 | 8/1966 | Frick | 15/104.05 X |
| 3,438,527 | 4/1969 | Gamblin, Jr. | 215/1 A |
| 4,078,692 | 3/1978 | Stein | 215/1 A X |
| 4,343,410 | 8/1982 | Lenda | 220/86 AT |

FOREIGN PATENT DOCUMENTS 535220 4/1941 United Kingdom .......... 220/86 AT

Primary Examiner—Allan N. Shoap
Assistant Examiner—Robert Petrik
Attorney, Agent, or Firm—Sughrue, Mion, Zinn, Macpeak & Seas

[57] ABSTRACT

A device (1) for fitting within the filler pipe (13) of the fuel tank of a motor vehicle to prevent the introduction into the filler pipe of a flexible hose for withdrawing fuel to the exterior of the tank comprises a body (2) having a plurality of planar radial vanes disposed in different planes and intersecting each other along a common axis (3) and a rod (4) having one end connected to the said body (2) and the opposite end fixable within the filler pipe of the tank.

11 Claims, 7 Drawing Figures

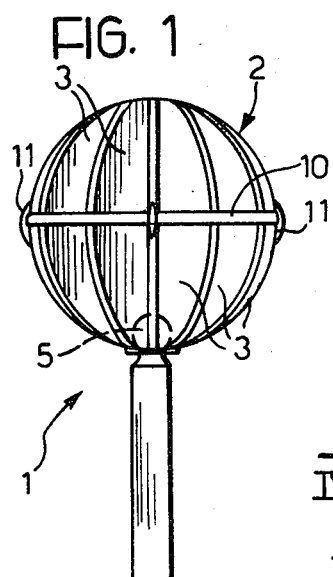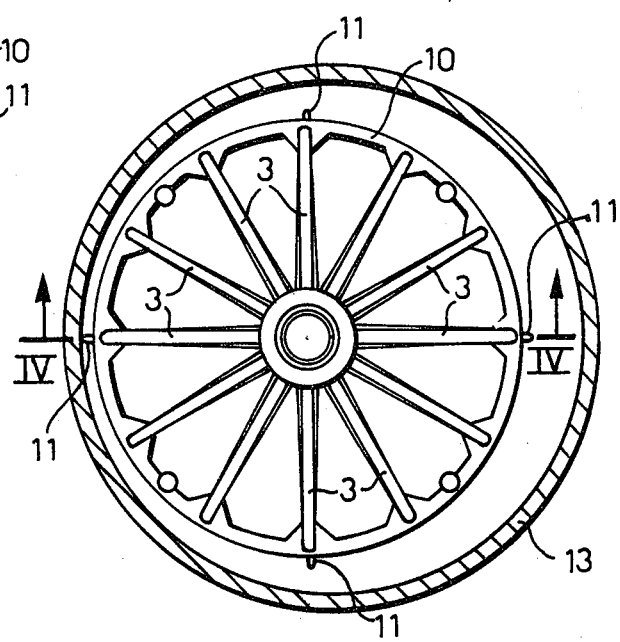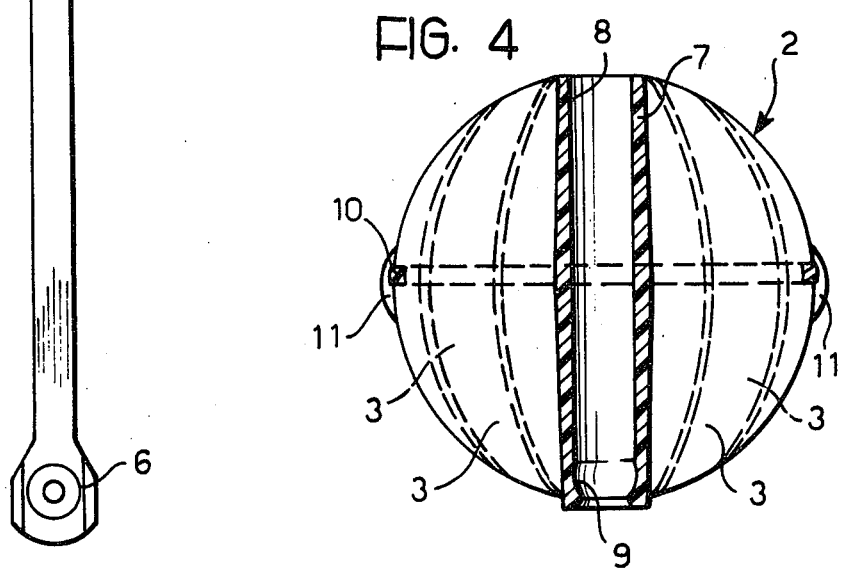

U.S. Patent  Mar. 27, 1984  Sheet 2 of 2  4,448,862

DEVICE FOR PREVENTING THE UNAUTHORIZED REMOVAL OF FUEL FROM THE TANK OF A MOTOR VEHICLE

The present invention relates to anti-theft devices fixable within the filler pipe of the fuel tank of a motor vehicle for preventing the introduction into the filler pipe of a flexible hose for withdrawing fuel to the exterior of the tank.

Various devices of this type have already been suggested (see, for example U.S. Pat. Nos. 1,766,916, 2,281,448, 2,496,992 and 3,002,649 and U.K. Pat. No. 535,220). All the known devices, however, are of complicated construction and assembly and cause regurgitation of fuel into the filler pipe during filling of the tank.

The object of the present invention is to provide a device of the type specified above which is simpler to construct and assemble and which allows a proper flow of fuel within the filler pipe during filling of the tank.

In order to achieve this object, the invention provides an anti-theft device for fitting within the filler pipe of a fuel tank of a motor vehicle to prevent the introduction of a flexible hose into the filler pipe for withdrawing fuel to the exterior of the tank, characterised in that the device includes a star-shaped body provided with a plurality of substantially planar radial vanes disposed in different planes with the vanes intersecting along a common axis and a rod having a first end connected to the said star-shaped body and its opposite end fixable within the filler pipe of the tank.

The device according to the present invention is simple and economical to construct (it may, for example, be formed by moulding from plastics material) and is easy and quick to assemble. Studies and experimental trials carried out by the Applicants have, moreover, shown that the device does not cause fuel to regurgitate into the filler pipe during filling of the tank.

Figure 6:
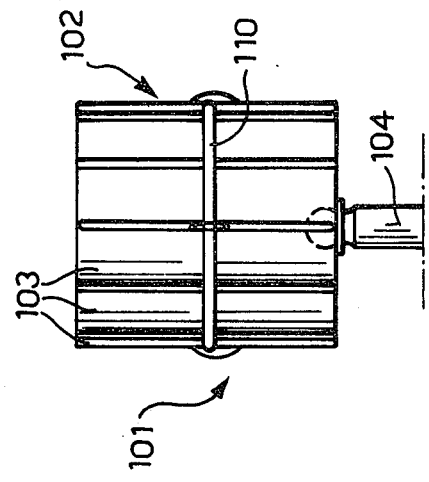
Figure 2:
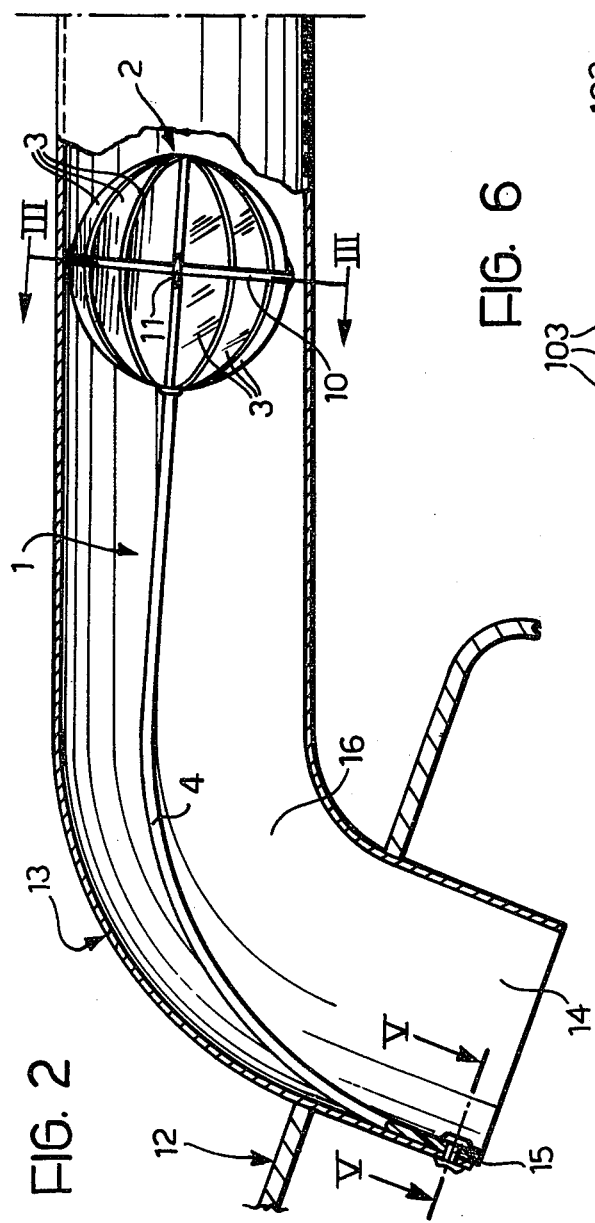
Figure 5:
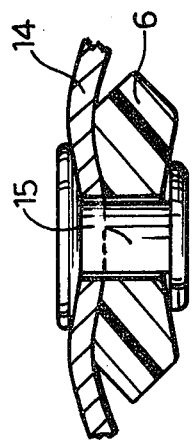

Further characteristics and advantages of the present invention will emerge from the following description with reference to the appended drawings, provided purely by way of non-limiting example, in which:

FIG. 1 illustrates a first embodiment of the device according to the invention,

FIG. 2 illustrates the device of FIG. 1 in its mounted condition within the filler pipe of a tank of a motor vehicle, FIG. 3 is a section taken on line III—III of FIG. 2, FIG. 4 is a section taken on line IV—IV of FIG. 3, FIG. 5 is a sectional view, on an enlarged scale taken on line V—V of FIG. 2, FIGS. 6 and 7 illustrate second and third embodiments of the device according to the present invention, respectively.

In FIG. 1, an anti-theft device for preventing the unauthorised removal of fuel from the tank of a motor vehicle is generally indicated by reference numeral 1, and includes a body 2 provided with a plurality of planar radial vanes 3 disposed in different planes which intersect each other along a common axis and having semi-circular outer edges lying in meridian planes of a common spherical surface. The device 1 further includes a support rod 4 having one end 5 connected to the body 2 and an end 6 intended to be secured within the filler pipe of a tank of a motor vehicle.

As illustrated in FIG. 4, the body 2 has a central core 7 with a cylindrical through-bore 8 the axis of which coincides with the axis of the body 2. At one end of the bore 8 the wall of the bore has a spherical surface portion 9 in which the end 5 of the support rod 4, which is spherically shaped, fits.

Both the star-shaped body 2 and the support rod 4, in the example illustrated, are formed from moulded plastics material.

The outer edges of the radial vanes 3 of the star-shaped body 2 are interconnected by a stiffening ring 10 (see FIG. 3) disposed in a plane perpendicular to the axis of the body 2 and equidistant from the two poles for this body.

Finally, four vanes of the plurality of vanes 3, equiangularly spaced from each other, are each provided in correspondence with the stiffening ring 10 with a small radial tongue 11 which lies substantially in the plane of the respective vane 3 (see FIGS. 3,4).

The device 1 is intended to be fitted within the filler pipe of a fuel tank of a motor vehicle in the manner illustrated in FIG. 2. In this Figure, the reference numeral 12 indicates the wall of a tank (partially illustrated) of a motor vehicle provided with a filler pipe 13 for the introduction of fuel into the tank 12 and having one end 14 disposed within the tank.

The end 6 of the support rod 4 of the anti-theft device 1 is fixed to the wall of the end 14 of the filler pipe 13 by means of a rivet 15. Any leakage of fuel through the aperture of the rivet 15 is of no consequence since the rivet is disposed in the part of the filler pipe which is situated within the tank 12.

As is clearly seen from FIG. 2, the device 1 is mounted in an elbow 16 of the filler pipe 13 whereby the support rod 4, which has its two ends located on opposite sides of this elbow, is deformed elastically and consequently presses the body 2, which is mounted in the filler pipe with a certain clearance, against the wall of the filler pipe 13.

In this way the device is prevented from vibrating and being a source of noise during the running of the motor vehicle.

Naturally, the device may also be mounted in a straight section of the filler pipe, in which case it would be designed with an optimum length of the rod 4 so as to press the body 2 elastically against the wall of the filler pipe 13.

The device described above prevents the insertion of a flexible hose into the filler pipe for the withdrawal fuel to the exterior of the tank. At the same time, as experiments carried out by the Applicants have shown, it allows the proper flow of fuel through the filler pipe during filling of the tank. Furthermore, the device is simple and economic to construct, quick to fit and does not require the filler pipe to be shaped in any particular way.

In a practical embodiment of the device illustrated in FIGS. 1 to 4, the diameter of the body 2 was 43 mm and the internal diameter of the filler pipe 13 was 48 mm. The maximum diameter of a flexible hose which can be inserted between two adjoining vanes 3, or between the star-shaped body 2 and the wall of the filler pipe 13, was 7.5 mm. With such a small diameter the operation of withdrawing fuel from the tank was so time-consuming as to be impractical.

The stiffening ring 10 prevents deformation of the radial vanes 3, such as would allow the passage of the said flexible hose when an attempt is made to force the latter into the filler pipe.

FIGS. 6 and 7 illustrate two anti-theft devices of a type similar to that illustrated in FIGS. 1 to 5 which differ from the latter in that the radial vanes have outer edges with a profile other than semi-circular.

The device illustrated in FIG. 6, which is indicated in its entirety by the reference numeral 101, includes a support rod 104 and a body 102 having a plurality of radial vanes 103 the external edges of which have a straight profile parallel to the axis of the star-shaped body, whereby the latter has a generally cylindrical rather than spherical configuration.

The device illustrated in FIG. 7, which is indicated by the reference numeral 201, includes a support rod 204 and a plurality of radial vanes 203 which are triangular in shape whereby the body 202 has a generally double-cone shaped configuration.

Both the devices 101,201 also have stiffening rings 110,210, similar to the stiffening ring 10 described above. The stiffening rings 10,110 and 210 are preferably moulded integrally with the star-shaped bodies 2,102 and 202.

Naturally, the profile of the outer edges of the radial vanes of the body may take on the appearance of a polygon having any number of sides, so as to give the star-shaped body a generally polyhedral configuration.

It will be understood that the devices illustrated in FIGS. 6 and 7 and the possible variants are also fitted within the filler pipe in the manner illustrated in FIG. 2.

It will be further appreciated that the number of radial vanes 3,103,203, of the device is chosen so as to make the maximum diameter of the flexible hose which is insertable between two adjacent vanes as small as is wished. Furthermore, these vanes may also lie in planes which are not perfectly radial.

Naturally, the principle of the invention remaining the same, details of construction of practical embodiments may be varied widely with respect to what has been described and illustrated purely by way of example, without thereby departing from the scope of the present invention.

What is claimed is:

1. Anti-theft device for fitting within the filler pipe of a fuel tank of a motor vehicle to prevent the introduction into the filler pipe of a flexible hose for withdrawing fuel to the exterior of the tank, wherein the device comprises:
   a body provided with a cylindrical core and a plurality of substantially planar closely spaced radial vanes extending outwardly from said core, said vanes lying in different planes which intersect each other along a common axis, and
   a rod having a first end connected to the said body and means at the opposite end of said rod for anchorage within the filler pipe.

2. Anti-theft device as defined in claim 1, wherein the radial vanes of the body have semi-circular outer edges disposed in meridian planes of a common spherical surface.

3. Anti-theft device as defined in claim 1, wherein the radial vanes of the body have straight outer edges parallel to the axis of the body whereby the latter has a generally cylindrical configuration.

4. Anti-theft device as defined in claim 1, wherein the radial vanes of the body have linear outer edges, whereby the body has a generally polyhedral configuration.

5. Anti-theft device as defined in any one of claims 1 to 4 including a stiffening ring interconnecting the outer edges of the radial vanes.

6. Anti-theft device as defined in claim 5, wherein the said stiffening ring is formed integrally with the body.

7. Anti-theft device as defined in claim 1, wherein the body and the support rod are molded in plastics material.

8. Anti-theft device as defined in claim 7, wherein the said first end of the support rod is spherically shaped and is fitted within a corresponding spherical seat of the body.

9. Fuel tank for motor vehicles provided with a filler pipe and an anti-theft device fitted within the filler pipe to prevent the introduction into the filler pipe of a flexible hose for withdrawing fuel to the exterior of the tank, wherein said anti-theft device comprises a body provided with a plurality of substantially radial vanes and a rod having a first end connected to the body and a second end fixed within the filler pipe and wherein said body is disposed within the filler pipe with clearance and the support rod is in an elastically deformed condition so as to press the body against the wall of the filler pipe.

10. Fuel tank as defined in claim 9, wherein the filler pipe has an elbow and the support rod is disposed in said elbow with said first and second ends situated on opposite sides of the elbow.

11. Fuel tank as defined in claim 9 or claim 10, wherein the said second end of the support rod is fixed by means of a rivet to a portion of the filler pipe which is within the tank.

* * * * *